US006921098B2

(12) United States Patent
VanDenberg et al.

(10) Patent No.: US 6,921,098 B2
(45) Date of Patent: Jul. 26, 2005

(54) INDEPENDENT SUSPENSION SYSTEM FOR LIGHT AND MEDIUM DUTY VEHICLES

(75) Inventors: Ervin VanDenberg, Massillon, OH (US); David H. Croston, Navarre, OH (US)

(73) Assignee: Suspension Technology, Inc., Canton, OH (US)

( * ) Notice: Subject to any disclaimer, the term of this patent is extended or adjusted under 35 U.S.C. 154(b) by 137 days.

(21) Appl. No.: 10/001,037

(22) Filed: Nov. 28, 2001

(65) Prior Publication Data

US 2002/0079665 A1 Jun. 27, 2002

Related U.S. Application Data

(60) Provisional application No. 60/253,619, filed on Nov. 28, 2000.

(51) Int. Cl.[7] .............................. B60G 3/12; B60G 9/00; B60G 11/64; F16D 55/18
(52) U.S. Cl. ...................... 280/124.116; 280/124.128; 280/124.162; 267/64.14; 188/72.4
(58) Field of Search .............................. 188/71.1, 72.1, 188/72.4, 355, 356; 280/124.129, 124.166, 86.5, 43.18, 43.19, 43.23, 124.157, 124.162, 124.128, 124.116, 124.125, 124.13, 124.148, 124.149; 267/64.14, 64.28, 256

(56) References Cited

U.S. PATENT DOCUMENTS

| | | | | |
|---|---|---|---|---|
| 2,210,485 A | * | 8/1940 | Hawkins ..................... 280/104 |
| 2,645,313 A | * | 7/1953 | Schaadt ...................... 188/355 |
| 2,869,891 A | * | 1/1959 | Venditty et al. ...... 280/124.106 |
| 2,905,459 A | * | 9/1959 | Fikse ......................... 267/256 |
| 3,033,591 A | * | 5/1962 | Ward ....................... 280/86.75 |
| 3,140,880 A | * | 7/1964 | Masser ................ 280/124.108 |
| 3,713,665 A | * | 1/1973 | Gouirand ................. 280/6.157 |
| 3,920,261 A | * | 11/1975 | Ellingsen et al. .......... 280/81.5 |
| 3,984,125 A | * | 10/1976 | Paton et al. .......... 280/124.177 |
| 4,690,388 A | * | 9/1987 | Harrison ...................... 267/35 |
| 4,773,670 A | * | 9/1988 | Raidel, II .................. 280/86.5 |
| 5,346,246 A | * | 9/1994 | Lander et al. ........ 280/124.157 |
| 5,366,237 A | * | 11/1994 | Dilling et al. ........ 280/124.116 |
| 5,505,481 A | * | 4/1996 | VanDenberg et al. ...... 280/86.5 |
| 5,718,445 A | * | 2/1998 | VanDenberg ............... 280/676 |
| 5,746,441 A | * | 5/1998 | VanDenberg ........ 280/124.116 |
| 5,785,345 A | * | 7/1998 | Barlas et al. ......... 280/124.165 |
| 6,068,276 A | * | 5/2000 | Kallstrom ............ 280/124.157 |

FOREIGN PATENT DOCUMENTS

GB          2154187 A   *  9/1985   ........... B60G/11/64

* cited by examiner

*Primary Examiner*—Paul N. Dickson
*Assistant Examiner*—Laura B. Rosenberg
(74) *Attorney, Agent, or Firm*—Sand & Sebolt

(57) ABSTRACT

The present invention relates to an improved vehicle suspension system. More particularly, the present invention relates to an independent suspension system for light and medium duty trailers which utilizes a flexible bladder mounted between the vehicle frame and the axle. The flexible bladder is housed within a casing to control the flow of air into the bladder and to provide for flexible movement of the axle relative to the vehicle frame. In the preferred embodiment, the flexible bladder is a traditional break-chamber housing and multiple break-chamber housings may be utilized to increase the load-carrying capacity of the trailer.

75 Claims, 10 Drawing Sheets

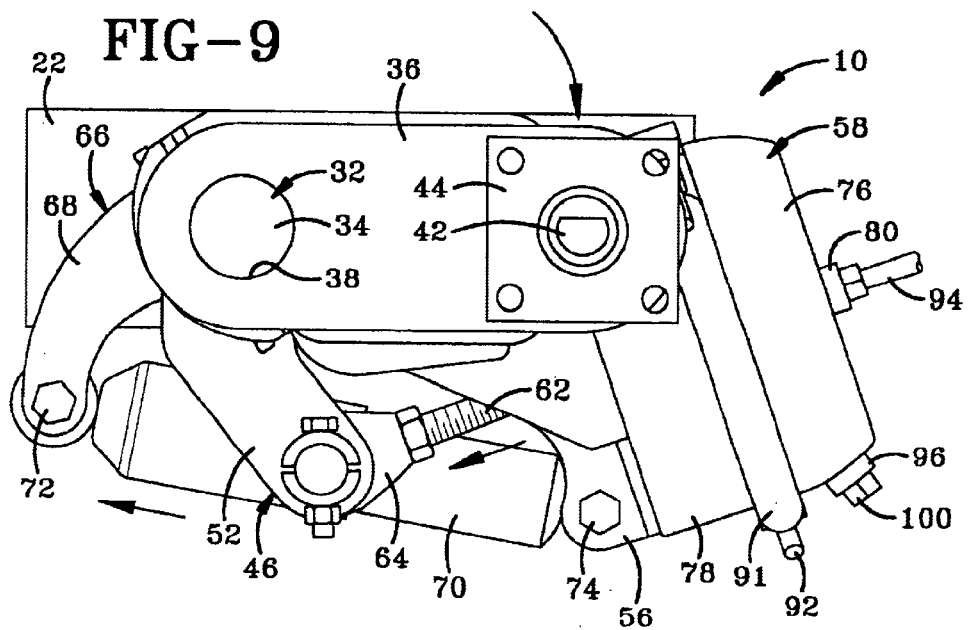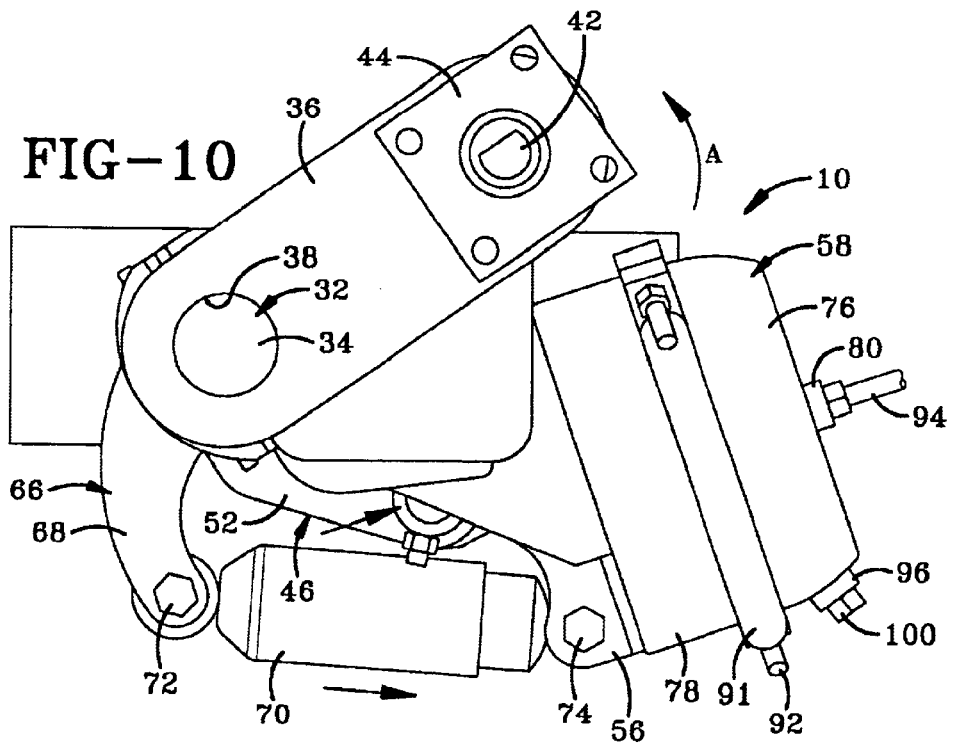

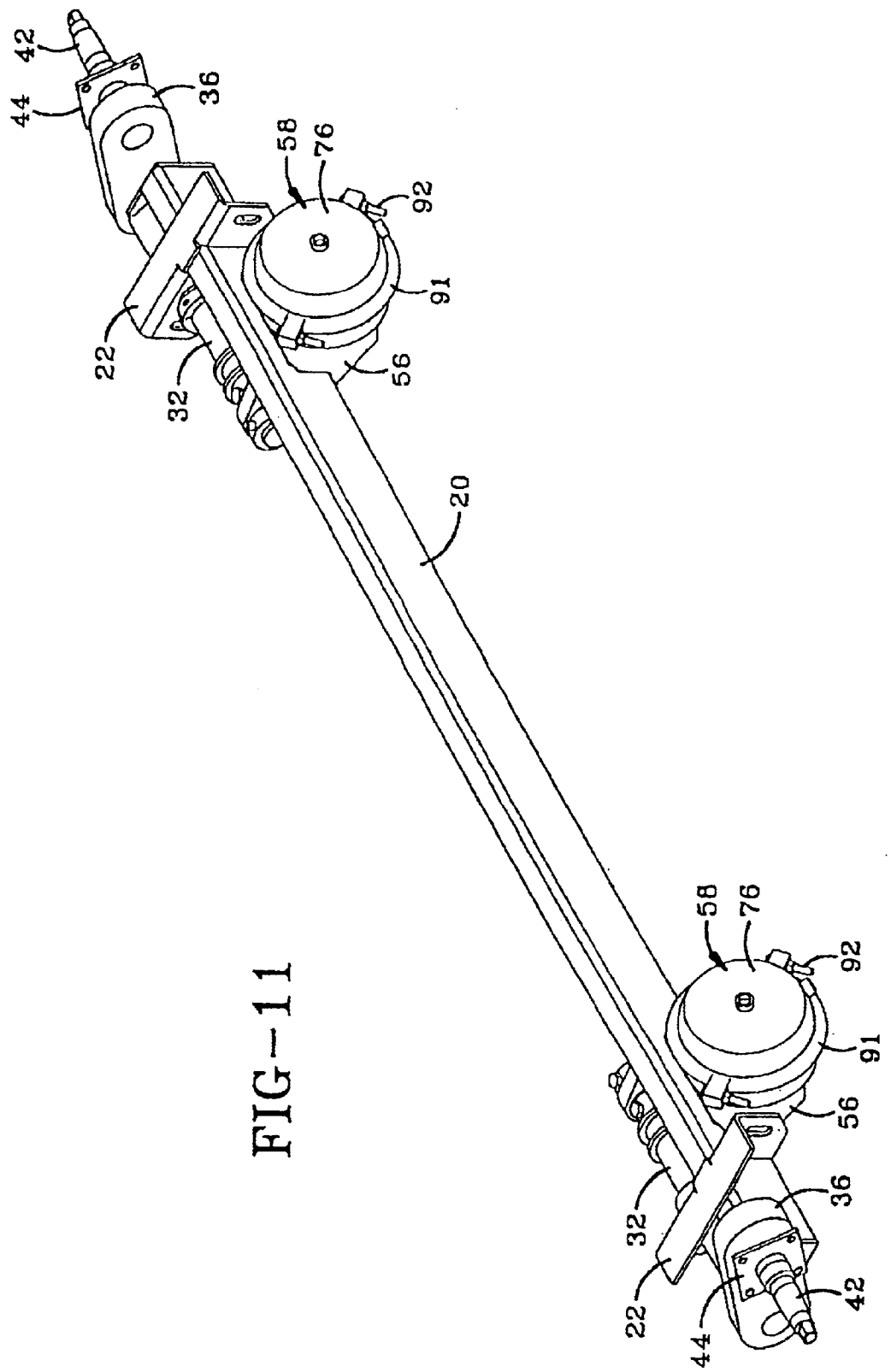

INDEPENDENT SUSPENSION SYSTEM FOR LIGHT AND MEDIUM DUTY VEHICLES

BACKGROUND OF THE INVENTION

1. Technical Field

The invention relates generally to an improved vehicle suspension system. More particularly, the invention relates to an improved vehicle suspension system for use with light and medium duty trailers. More specifically, the invention relates to a suspension system for light and medium duty trailers which utilizes enclosed diaphragms to provide vertical support between the trailer and the axle.

2. Background Information

The trucking industry has witnessed a dramatic increase in the costs associated with transporting goods. Additionally, there has been on increase in the sale of pickup style trucks and sport utility vehicles assuring that a much broader range of people have vehicles with the capacity to pull light and medium duty trailers. The need to pull light and medium duty trailers has also increased with the associated increase in the growth of small businesses throughout the world. These changes in the trucking industry, and in the number of people interested in purchasing and subsequently using light and medium duty trailers necessitates the need for an efficient and relatively inexpensive suspension system for use on light and medium duty trailers.

Suspension systems may take a variety of forms, including parallelogram suspensions and leading and trailing beam type suspensions, any of which may utilize either mechanical springs, air springs or a combination of both mechanical springs and air springs. In the past, light and medium duty trailers often utilized mechanical springs and/or torsion tubes as a way of taking up the necessary movement between the axle and the trailer frame while supporting the vertical loads associated with the trailer. Mechanical springs often took the form of coil leaf springs, variations on sear springs, and coil springs.

Additionally, torsion tubes were often utilized and often took the form of an axle with one or more rubber components whereby movement of the axle relative to the trailer was taken up by twisting or deflecting the rubber components. While these method of operation were presumably adequate for the purpose for which they were intended, they do not provide the smooth even ride of an air type suspension system, and also do not provide for load leveling characteristics commonly associated with air type suspension systems. While air type suspension systems have been contemplated for light and medium duty trailers, the cost of such systems has been somewhat high when compared to the limited cost of light and medium duty trailers and as such, have never gained wide acceptance.

A number of the problems associated with air ride suspension systems on light and medium duty trailers include the cost of the air spring and the necessary mechanical linkages to control the movement of the air spring. These costs are relatively high compared to existing mechanical style suspension systems. Additionally, air springs, or air bladders, support vertical load and provide a dampening between the axle and the trailer frame. However, air bladders themselves provide no resistance lateral and longitudinal deflection and therefore must be artificially stabilized by mechanical linkages extending between the axle and the frame to isolate the air spring and assure that the air spring provides only vertical support and dampening. These linkages coupled with relatively high initial cost and replacement cost of air springs made air ride suspension systems for light and medium duty trailers too costly for widespread acceptance.

The need thus exists for an air ride suspension system for light and medium duty trailers which provides for an air bladder which is stable and which adequately provides a dampening force between movement of the axle relative to the trailer frame while simultaneously supporting the vertical load associated with the trailer.

SUMMARY OF THE INVENTION

Objectives of the invention include providing an air ride suspension system for light and medium duty trailers. This and other objectives of the invention are obtained by the improved vehicle suspension system, the general nature of which may be stated as including a suspension system for use with a vehicle having a frame and a tire wheel assembly comprising a suspension frame rail, at least one flexible bladder mounted to the frame rail and adapted to be mounted adjacent each side of the frame, at least one torque bar extending adjacent to the suspension frame rail, a flexible bladder being operatively connected to the torque bar, and a spindle adapted to receive a tire wheel assembly attached to the torque bar whereby movement of the spindle is reacted by the flexible bladder. This objective is also carried out by a method of supporting a load on a vehicle comprising the steps of providing a vehicle with a frame and a pair of tire wheel assemblies, applying a force either upwardly or downwardly on the tire wheel assemblies, transferring the force from the tire wheel assembly into a torque rod, rotating the torque rod as a result of the force, and reacting the torque rod in at least one brake chamber mounted to the frame.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

FIG. 9 is a side elevational view similar to that shown in FIG. 8 and shown in the lowest operable position;

FIG. 10 is a side elevational view similar to FIG. 9 shown with a suspension system in the upper most operable position; and FIG. 11 is a front elevational view of a second embodiment of the present invention.

Similar numerals refer to similar parts throughout the drawings.

DESCRIPTION OF THE PREFERRED EMBODIMENTS

Figure 1:
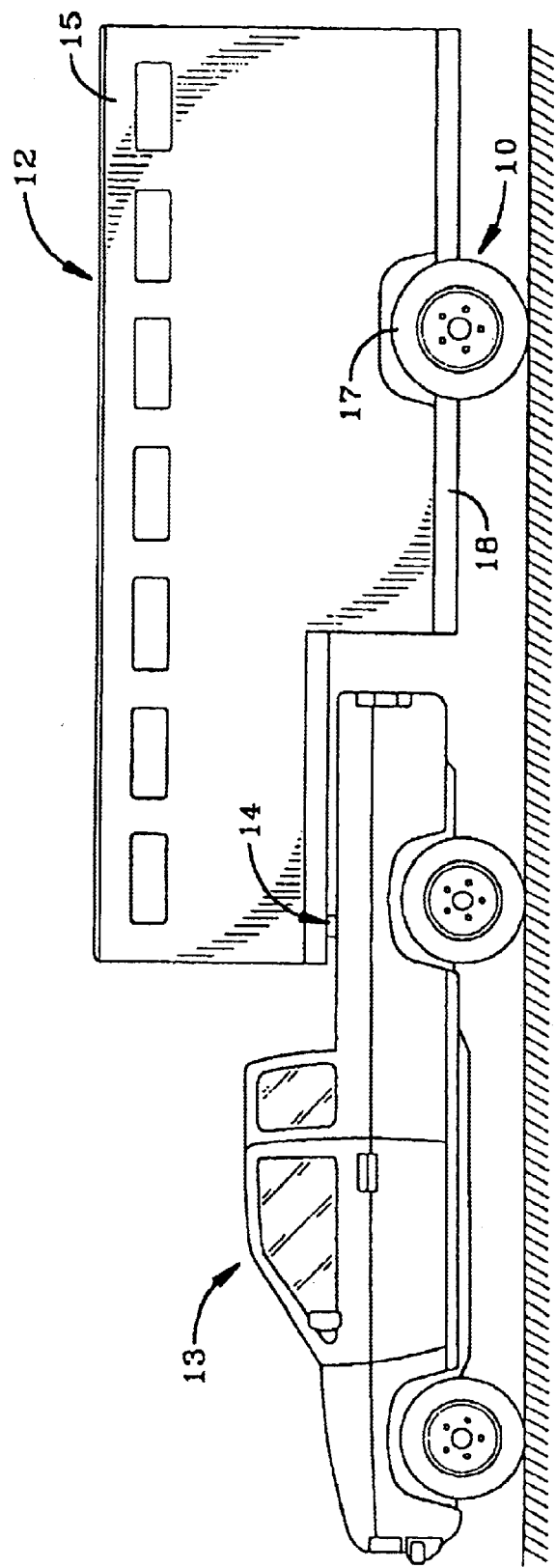
FIG. 1 is a side elevational view of a truck and trailer with a suspension system applied to the trailer.

The improved vehicle suspension system of the present invention is indicated generally at 10 mounted on a trailer 12 being pulled by a tow vehicle 13. Tow vehicle 13 and trailer 12 may be interconnected by a variety of mechanical connections including a bumper pull hitch, a fifth wheel hitch or a gooseneck hitch such as the one shown in FIG. 1 and indicated generally at 14. Generally tow vehicle 13 and trailer 12 are attached mechanically as described above and also electronically so that operation of the various electrical systems such as brake lights, back up lights and running lights may be operated on the trailer as these systems are operated on the truck.

Figure 2:
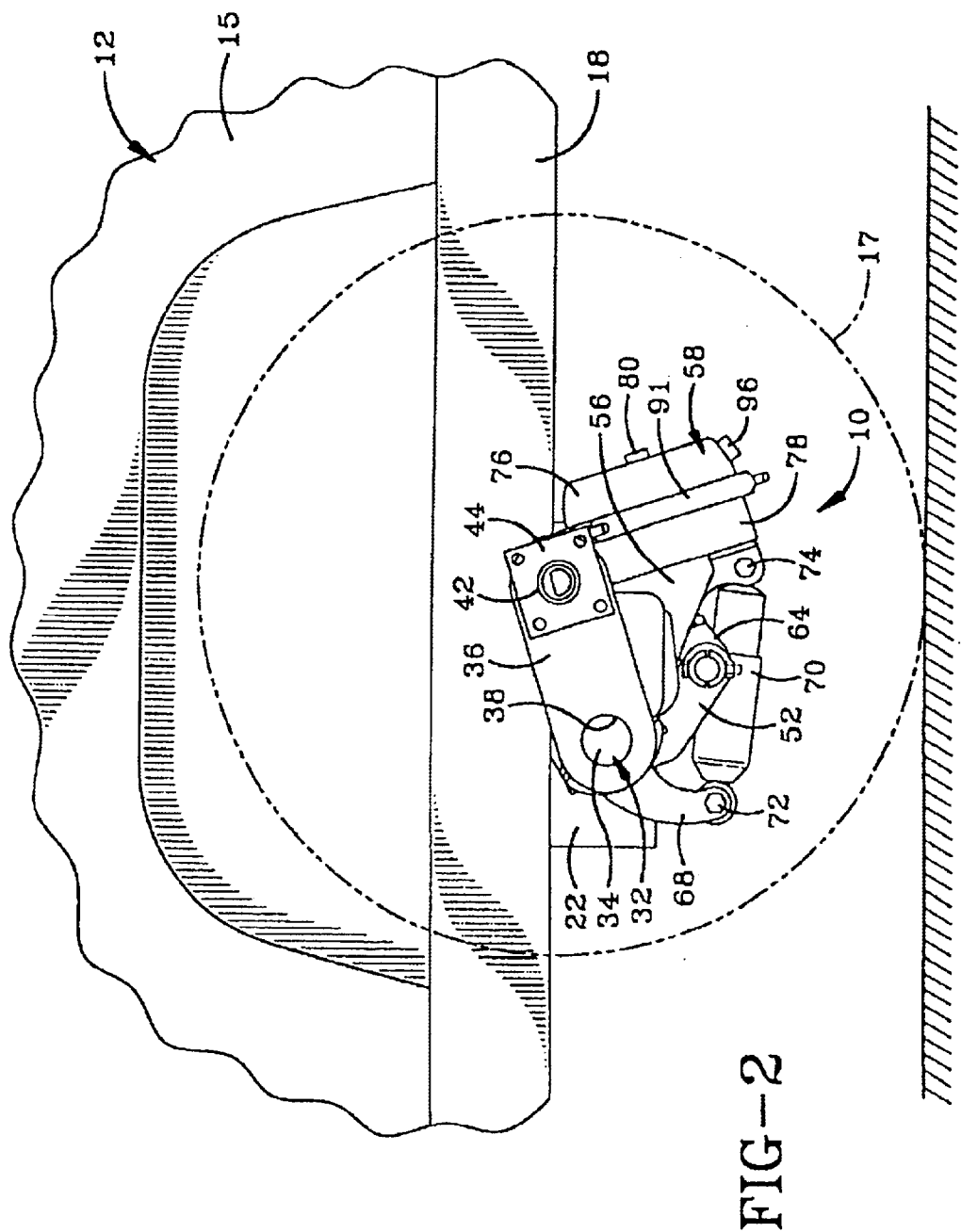
FIG. 2 is a cutaway view of the trailer shown in FIG. 1 with portions shown in dot dash lines to expose the underlying suspension system.
Figure 3:
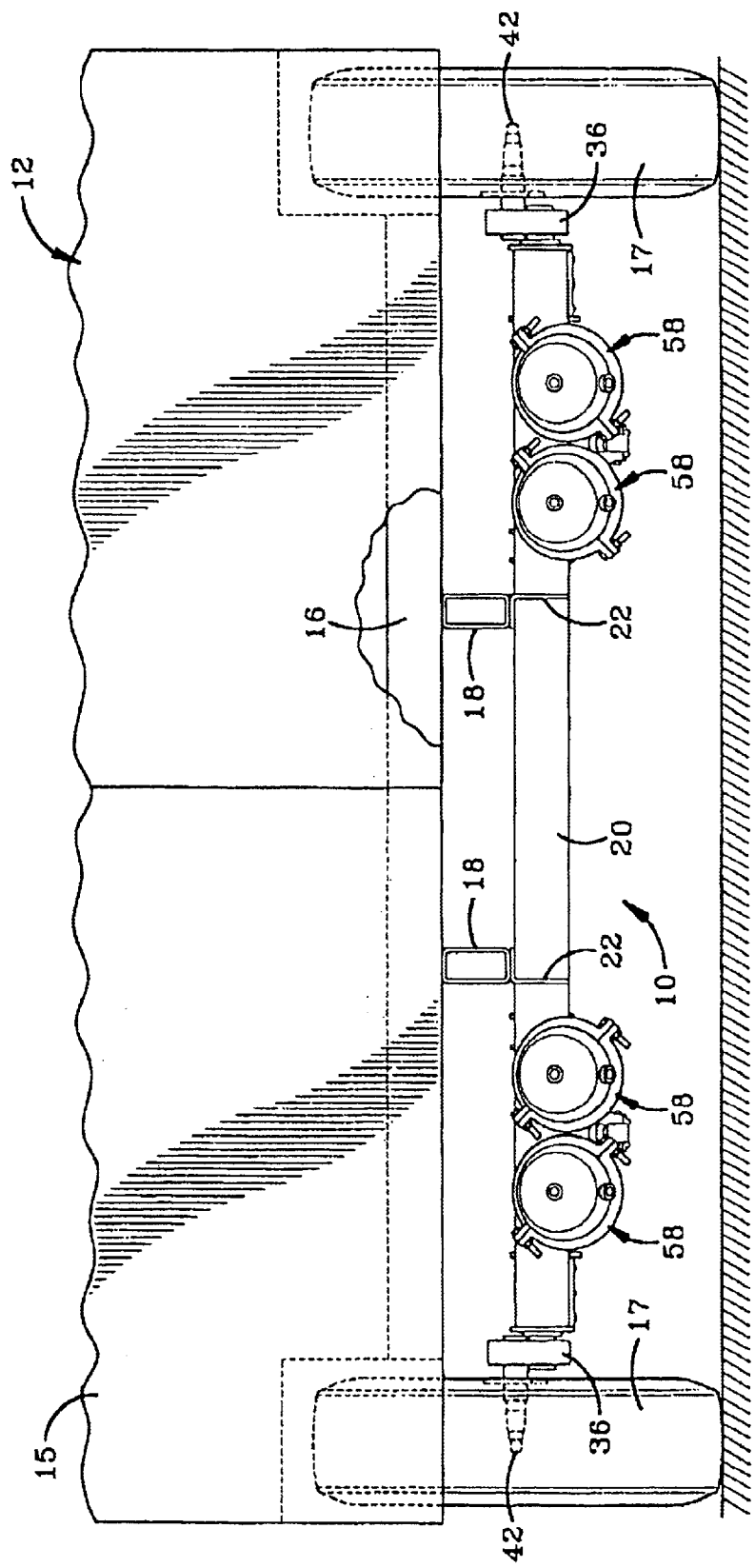
FIG. 3 is a rear elevational view of the trailer shown in FIG. 1 with portions cut away.
Figure 4:
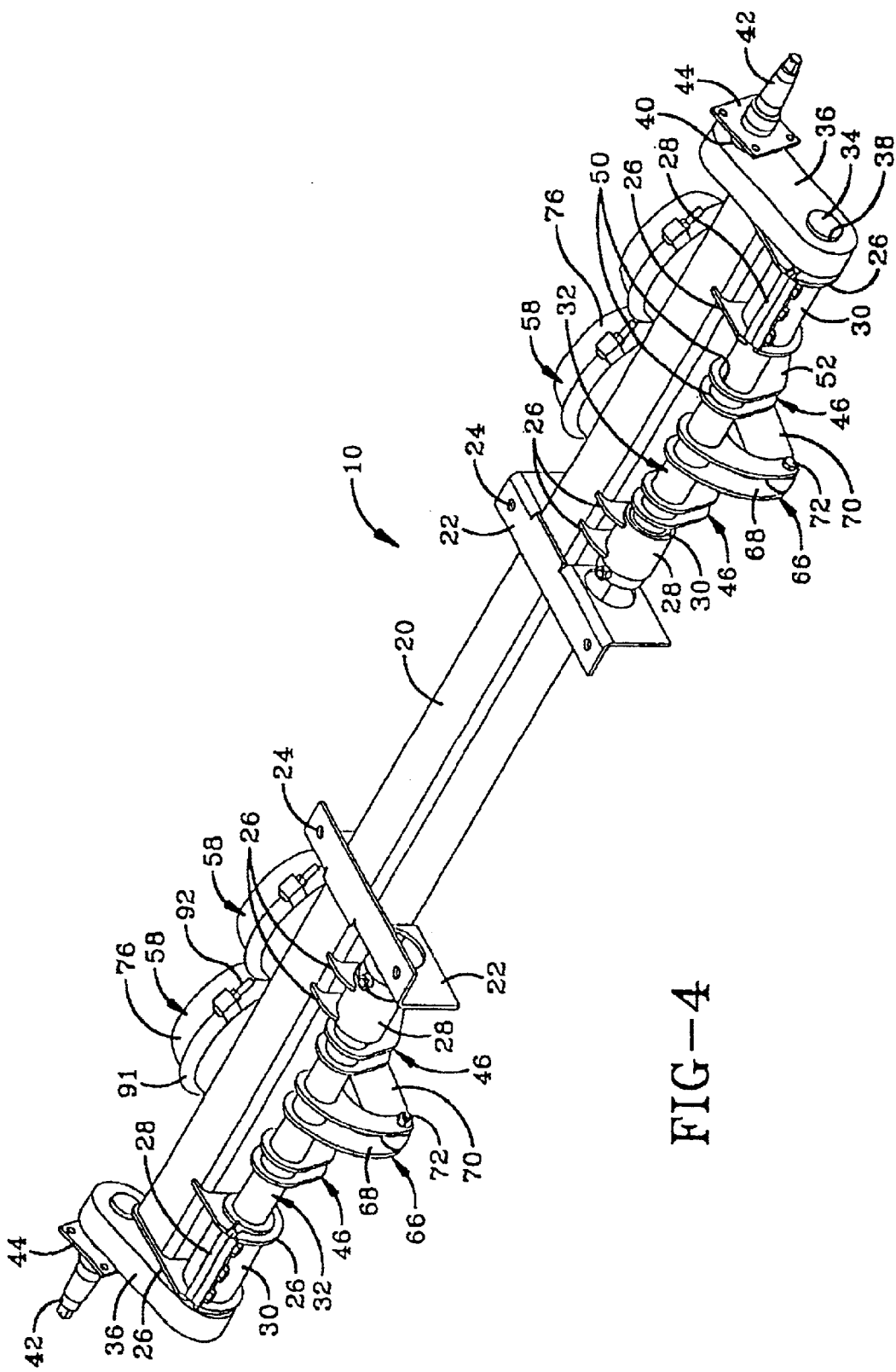
FIG. 4 is a front perspective view of the suspension system of the present invention.

Referring more particularly to FIGS. 2 and 3, trailer 12 includes a cargo box 15 having a pair of cross support members 16 mounted beneath box 15 as well as at least one pair of tire wheel assemblies 17. Trailer 12 may also include a plurality of support beams 18 extending at various locations along the length of trailer 12.

In accordance with the present invention, suspension system 10 includes a frame rail 20 extending substantially across the width of trailer 12. Frame rail 20 may take a variety of cross-sectional configurations including round, square and rectangular. The beam is shown as square in the present description, but may take other configurations without departing from the spirit of the present invention. Frame or frame rail 20 includes a pair of angle brackets 22. Angle bracket 22 are parallel and spaced apart a distance substantially equal to the distance between support beams 18. Angle brackets 22 include a plurality of mounting holes 24 to accept bolts for bolting suspension system 10 to trailer 12. Additionally, angle brackets 22 may take a variety of configurations depending on the particular trailer to which the suspension system is to be mounted. Trailers may have a variety of configurations each of them somewhat different based on the use of the trailer, and the manufacturer of the trailer. Angle brackets 22 are simply manufactured to provide the most expedient mounting method to a given trailer 12 and may be varied accordingly without departing from the spirit of the present invention.

Referring then to FIGS. 2–7, a plurality of bearing brackets 26 extend outwardly from the front of frame 20. Bearing brackets 26 are each welded to the outer casing 28 of a bearing 30. Each bearing 30 includes a through aperture sized to receive a torque bar 32. Torque bar 32 extends through each bearing 30 such that torque bar 32 is rotatably supported in bearings 30 by way of bearing brackets 26 such that the weight of torque bar 32 is ultimately carried by frame 20.

Torque bar 32 includes an outer end 34 having a spindle lever 36 mounted thereon. Spindle lever 36 is formed with a first hole 38 complementarily shaped to outer end 34 of torque bar 32 such that when spindle lever 36 is placed over the edge of outer end 34 of torque bar 32 and is mounted thereon. Spindle lever 36 is also formed with a second hole 40 sized to receive a spindle 42. Spindle 42 may have a variety of configurations, but in the present invention, extends through second hole 40 formed in spindle lever 36 and also includes a mounting plate 44 for retaining a brake assembly (not shown). Referring more particularly to FIG. 3, spindle 44 and tire wheel assembly 17 are mounted onto spindles 42 to provide rotational movement of spindle 42 and tire wheel 17 relative to trailer 12.

In accordance with another feature of the present invention, two spaced apart mounting devises 46 are mounted onto torque bar 32 intermediate bearings 30. Each mounting clevis 42 includes a pair of spaced apart arms 48 having an aperture 50 formed therethrough. Each mounting clevis 46 includes a lower arm 52 whereby arms 48 of lower arm 52 define a space 54 therebetween.

A large mounting bracket 56 is mounted to the front of frame 20 and supports a diaphragm chamber assembly 58 by way of mounting bolts 60. Diaphragm chamber assembly 58 includes a push rod 62 having a pivot clevis 64 mounted on the free end thereof. Pivot clevis 64 extends intermediate lower arms 52 into space 54 and is mounted thereto by any convenient mounting means such as a mounting pin or bolt. The operation of diaphragm chamber assembly push rod 62 and pivot clevis 64 will be described in more detail hereinbelow.

Figure 5:
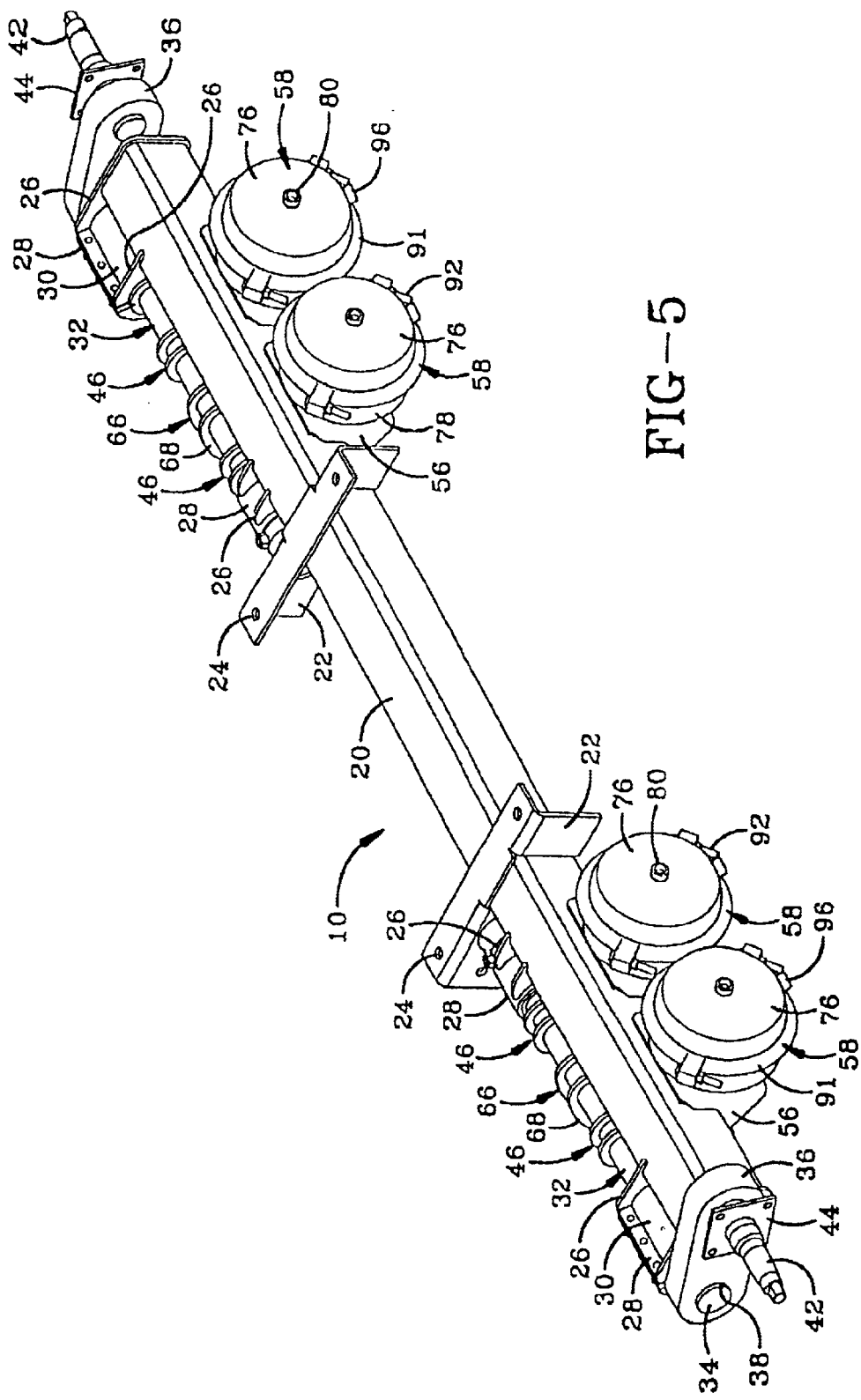
FIG. 5 is a rear perspective view of the suspension system of the present invention.
Figure 6:
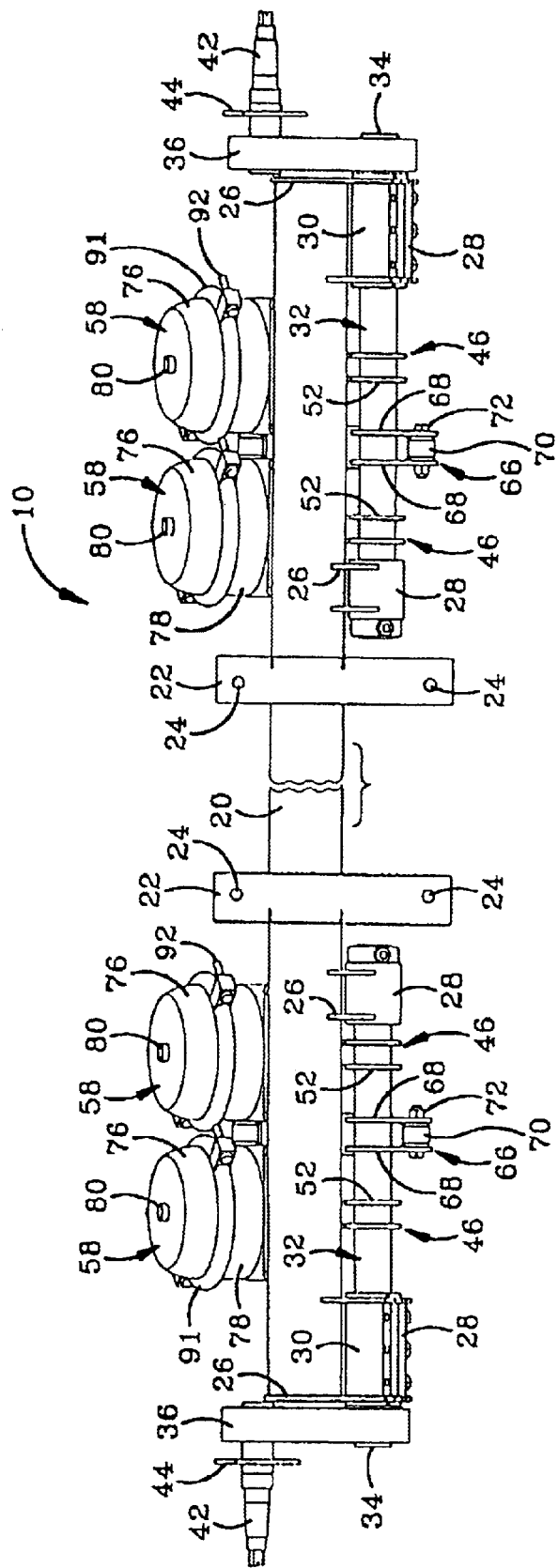
FIG. 6 is a top plan view of the suspension system of the present invention.
Figure 7:
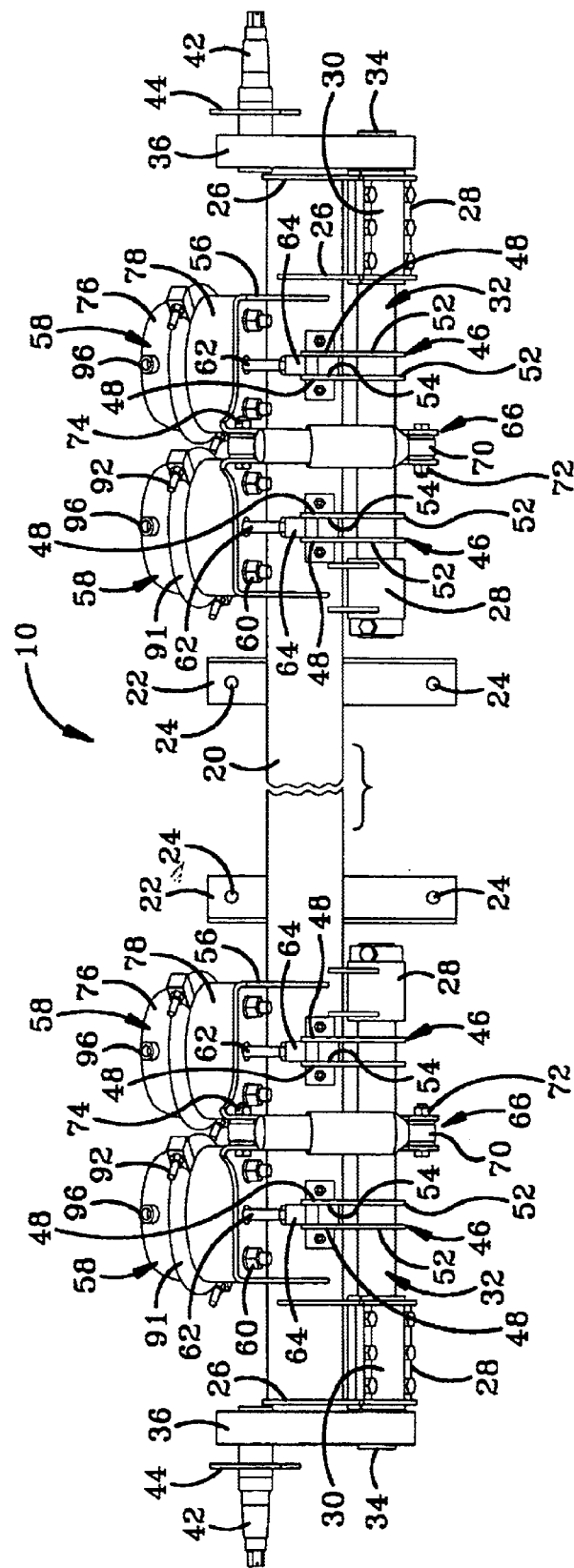
FIG. 7 is a bottom plan view of the suspension system of the present invention.

As is evident from FIGS. 5–7, a large mounting bracket 56 is provided adjacent each mounting clevis 46 for supporting an associated diaphragm chamber assembly 58 and for receiving an associated push rod 62. Referring to FIG. 7, suspension system 10 is shown having a pair of diaphragm chamber assemblies 58 mounted to each side of frame 20 providing a total of four mounting chambers for tire wheel assembly 17 mounted on spindles 42. Referring again to FIGS. 2–7, a central clevis 66 is shown attached to torque bar 32 intermediate mounting devises 46. Central clevis 66 is secured to torque bar 32 by any convenient mounting means such as welding, and includes a pair of parallel and spaced apart mounting arms 68. Mounting arms 68 are spaced apart and sized to receive a first end of a shock absorber 70. Shock absorber 70 is mounted to mounting arm 68 by way of a bolt 72 and extends upwardly between large mounting brackets 56 and is mounted thereto via a bolt 74. Shock absorber 72 provides a force dampening when tire wheel assembly 17 are moving on extremely rough terrain, or driving at high speeds over uneven pavement and during normal operation to reduce the reactionary effects of diaphragm chamber assemblies 58.

Figure 8:
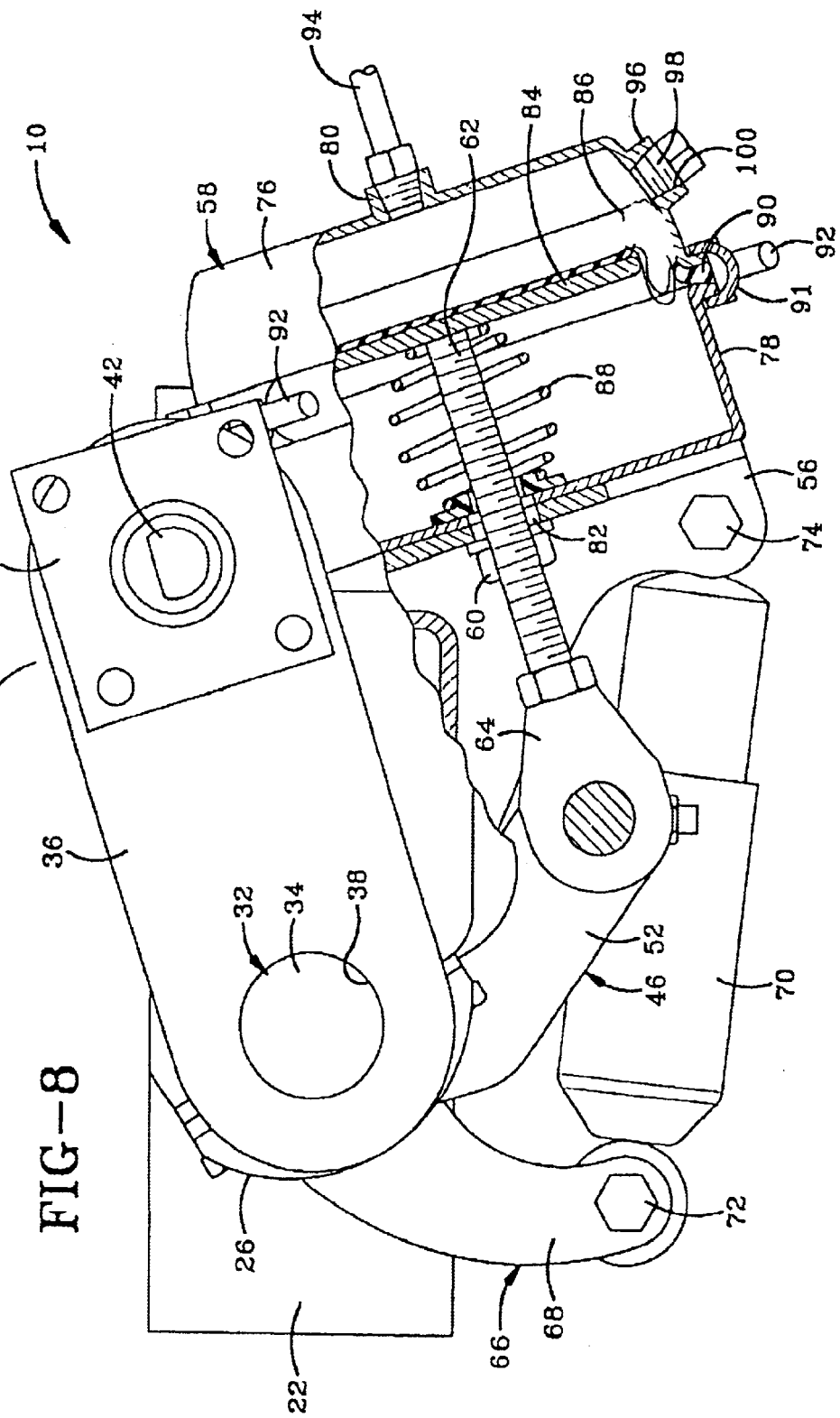
FIG. 8 is a side elevational view of the suspension system of the present invention with portions cut away and shown in section.

Referring specifically to diaphragm chamber assembly 58, and looking more particularly at FIG. 8, diaphragm chamber assembly 58 includes an upper chamber 76 and a lower chamber 78 with both upper and lower chambers 76 and 78 being formed with a central aperture 80 and 82 respectively. As described above, push rod 62 is formed on one end with a pivot clevis 64 with the other end being mounted to a bladder plate 84. Bladder plate 84 is then positioned adjacent to the central portion of a flexible bladder 86. Flexible bladder 86 may take a variety of configurations, but in the preferred embodiment is a fiber reinforced rubber similar to that out of which rolling lobe air springs are manufactured. A coil spring 88 is mounted intermediate lower chamber 76 and bladder plate 84 to provide constant pressure against bladder plate 84 as may be required during operation.

In assembly, flexible bladder 86 includes a central portion as discussed above bearing against bladder plate 84 and an annular ridge 90 sandwiched between upper chamber 76 and lower chamber 78 during assembly. A clamp ring 91 is then positioned around annular ridge 90, upper chamber 76 and lower chamber 78 and is compressed by way of bolts 92. As bolts 92 are tightened, ring 91 becomes smaller and compresses upper chamber 76, lower chamber 78 and annular ridge 90 to secure an airtight arrangement. Central aperture 80 of upper chamber 76 is sized to receive a threaded attachment to secure air line 94 which is attached to any usual source of compressed air carried by the trailer 12, such as a compressor. Additionally, a second side aperture 96 is sized to receive a threaded input 98 which may provide an air outlet through hole 100.

As can be seen from our description of FIG. 8, and more particularly in accordance with the invention, diaphragm chamber assembly 58 and the elements associated therewith may take a variety of configurations without departing from the spirit of the present invention, but in accordance with the preferred embodiment of the invention, form a brake chamber such as those traditionally utilized with tractor trailer type air brakes. Diaphragm chamber assembly 58 provides a stabilized air bellows for dampening movement between spindles 42 and cargo box 15 while simultaneously supporting the vertical weight of trailer 12.

Operationally, and referring specifically to FIG. 8, air is provided through air input 94 from a usual source such as a compressor carried on trailer 12 such that air traveling through input 94 will flood upper chamber 76 with air at approximately 70–110 lbs. per square inch. Tire wheel assembly 17 is mounted onto spindle 42 as the weight of trailer 12 acts on tire wheel assembly 42, tire wheel assembly 17 will push upwardly on spindle 42 applying a rotational force in the direction of arrow A (FIG. 8) onto spindle lever 36. Inasmuch as spindle lever 36 is rigidly attached to torque bar 32, torque bar 32 will attempt to rotate as a result of force applied through spindle 42 in the direction of arrow A. However, torque bar 32 will resist rotation as a result of its interconnection to flexible bladder 86 in the following manner. Extending between torque bar 32 are a pair of mounting devises 46 attached respectively to a pivot clevis 64, a push rod 62 bearing directly against bladder plate 84 and ultimately flexible bladder 86. As torque bar 32 attempts to rotate in the direction of arrow A, such rotation will be resisted by the approximate 90 lbs. per square inch of pressure acting against flexible bladder 86 which resistance will pass through flexible bladder 86 to bladder plate 84 through push rod 62 into pivot clevis 64 and ultimately into mounting clevis 46 which is rigidly attached to torque bar 32. As can be seen, when trailer 12 is at rest, motion of spindle 42 in the direction of arrow A is counteracted by the air pressure acting against flexible bladder 86 inside diaphragm chamber assembly 58.

However, as the vehicle is in motion, tire wheel assembly 17 and spindle 42 will move through a range of motion to take up irregularities in the road surface and to stabilize trailer 12 from a variety of forces including lateral forces, longitudinal forces, brake reactivity, diagonal axle walk, and roll about the longitudinal axis. More particularly, and referring specifically to FIG. 9, if tire wheel assembly 17 associated with spindle 42 were to suddenly drop, for example, into a pothole or off of a curb, flexible bladder 86 would be permitted to expand as significantly less force would be acting through push rod 62 into bladder plate 84. As can be seen more specifically from FIG. 9, flexible bladder 86 moves into lower chamber 78 and push rod 62 moves towards the front of the vehicle all in response to the downward movement of spindle 42.

Conversely, when tire wheel assembly 17 mounted on spindle 42 encounters a bump, or attempts to drive over a curb, tire wheel assembly 17 will move upwardly, which upward movement will cause rotation in the direction of arrow A thereby substantially rotating torque bar 32 and causing the movement of mounting clevis 46 and push rod 62 into upper chamber 76 thereby substantially reducing the volume of air in diaphragm chamber assembly 58 as a result of the movement of flexible bladder 86 to substantially increase the pressure above flexible bladder 86. The movement from the positions shown in FIG. 8 and in FIG. 10 are also controlled by way of the movement of shock absorber 70 to slow the rate of reactivity inside diaphragm chamber assembly 58. Additionally, air outlet 100 may be utilized to connect multiple diaphragm chamber assemblies 58 together when on a common side of the vehicle, such as in a daisy chain fashion.

As is also evident from the description of the preferred embodiment, a number of variations of the invention may be provided without departing from the spirit of the present invention. Additionally, the suspension system of the present invention provides a number of benefits, including that the system may be preassembled and easily installed to an existing trailer during manufacture or may be retrofitted to an existing trailer as a single unit. Still further, the suspension system utilizes independent wheel suspension and is therefore extremely roll stable. Still further, single, tandem or tri-axle trailers may all utilize the invention and when multiple axles are utilized on a single trailer to increase load carrying capacity, diaphragm chamber assemblies 58 may be detached together by attaching air hoses from a first outlet 100 of a first chamber to an inlet of a second chamber on a second axle to provide axle to axle load equalization. Still further, the suspension system 10 provides a constant ride height and will not sag under load which is a feature that has not been found true with mechanical systems. Still further, because of the compact nature of the present invention, a lower trailer floor is generally realized which substantially aids in loading and unloading the trailer. Additionally, brake chambers are provided in varying sizes having varying vertical lift capacities and as such, brake chambers having the load carrying characteristics of suspension system 10 may be tailored by altering the size, and consequently the load carrying capability of diaphragm chamber assemblies 58.

In the drawings described above, two diaphragm chamber assemblies 58 were provided attached to each torque bar 32. Inasmuch as two brake chambers provide about 3,500 lbs. of vertical support, a suspension system may be provided with a single diaphragm chamber assembly on each side such as that shown in FIG. 11 which suspension system may be utilized on trailers weighing, when fully loaded 3,500 lbs. However, only two bladders may be utilized on trailers which weigh up to 3,500 lbs. when fully loaded. Six bladders may be provided, such that there are three bladders attached to each torque bar for trailers which weigh 10,500 lbs. when fully loaded. Still further, eight diaphragm chamber assemblies may be provided, or four associated with each torque bar 32, for supporting trailers which weight 14,000 lbs. when fully loaded.

As can be seen, multiple configurations may be provided for use under trailers having varying weights. As can also be seen from the description of drawings 1–10, and the variation shown in FIG. 11, the configuration is simple and inexpensive to change as all that is required is the addition of multiple diaphragm chamber assemblies onto the existing frame 20. Still further, inasmuch as flexible bladder 86 is housed within upper chamber 76 and lower chamber 78, it remains relatively stable and does not require the extensive exterior linkages included with traditional air springs in order to maintain the position of the air spring relative to the axle and the trailer frame. Still further, the replacement of traditional air springs is relatively expensive. Conversely, replacement of the flexible bladder 86 within the diaphragm chamber assembly 58 is relatively inexpensive and may be completed using traditional hand tools and requires very little knowledge on the part of the mechanic. As such, the objective of the invention to provide a more economical air suspension for light and medium duty trailers is realized.

Accordingly, the improved "Independent Suspension For Light And Medium Duty Vehicles" apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the "Independent Suspension For Light And Medium Duty Vehicles" is constructed and used, the characteristics of the construction, and the advantageous new and useful results obtained; the new and useful structures, devices, elements, arrangements, parts, and combinations are set forth in the appended claims.

What is claimed:

1. A suspension system for use with a vehicle having a frame and a tire wheel assembly, the system comprising:
   a suspension frame rail;
   at least one flexible bladder;
   a housing mounted to the suspension frame rail; the flexible bladder being enclosed within and attached to the housing;
   at least one torque bar having a central axis and extending adjacent to the suspension frame rail; the torque bar being rotatable about the central axis; and
   a spindle adapted to receive a tire wheel assembly attached to the torque bar whereby movement of the spindle is reacted by the flexible bladder;
   a push rod extending between the torque bar and the bladder whereby rotation of the torque bar causes movement of the push rod and applies force to the flexible bladder; and
   a mounting clevis rigidly attached to the torque bar; the push rod being moveably attached to the mounting clevis.

2. A suspension system for use with a vehicle having a frame and a tire wheel assembly, the system comprising:
   a suspension frame rail;
   at least one flexible bladder mounted to the frame rail;
   at least one elongated torque bar having a central axis which is longitudinal in the elongated direction of the torque bar; the torque bar extending adjacent to the suspension frame rail and being rotatable about the central axis; the torque bar being rotatably mounted to the suspension frame rail within a plurality of spaced bearings to provide the rotational movement; the plurality of spaced bearings having respective central axes which are coaxial with one another and with the central axis of the torque bar; and
   a spindle adapted to receive a tire wheel assembly attached to the torque bar whereby movement of the spindle is reacted by the flexible bladder.

3. A suspension system for use with a vehicle having a frame and a tire wheel assembly, the system comprising:
   a suspension frame rail;
   at least one flexible bladder mounted to the frame rail;
   at least one elongated torque bar having a central axis which is longitudinal in the elongated direction of the torque bar; the torque bar extending adjacent to the suspension frame rail and being rotatable about the central axis; and
   a spindle adapted to receive a tire wheel assembly attached to the torque bar whereby movement of the spindle is reacted by the flexible bladder; the spindle being elongated and having a central axis extending in the elongated direction of the spindle, the spindle axis being substantially parallel to the torque bar central axis and in which the torque bar central axis and the spindle central axis are offset.

4. A suspension system for use with a vehicle having a frame and a tire wheel assembly, the system comprising:
   a suspension frame rail;
   at least one flexible bladder mounted to the frame rail;
   at least one torque bar having a central axis and extending adjacent to the suspension frame rail; the torque bar being rotatable about the central axis; and
   a spindle adapted to receive a tire wheel assembly attached to the torque bar whereby movement of the spindle is reacted by the flexible bladder;
   the spindle having a central axis substantially parallel to the torque bar central axis; the torque bar central axis and the spindle central axis being offset; the distance between the torque bar central axis and the spindle central axis being in the range of from 4 inches to 5 inches; and
   a spindle lever extending outwardly from the torque bar and rigidly attached thereto, the spindle being mounted to the spindle lever.

5. A method of supporting a load on a vehicle comprising the steps of:
   providing a vehicle with a frame, a pair of tire wheel assemblies, a spindle for mounting each tire wheel assembly and a spindle lever connected to each of the spindle and a torque bar having a central axis;
   applying a force either upwardly or downwardly on the tire wheel assemblies;
   transferring the force from each tire wheel assembly into the torque bar;
   rotating the torque bar about the central axis as a result of the force;
   transferring the force from the spindle to the spindle lever; transferring the force from the spindle lever to the torque bar; and transferring the force from the torque bar to the flexible bladder;
   reacting the rotational movement of the torque bar in at least one flexible bladder mounted to the frame; and
   supplying air to a chamber adjacent the flexible bladder to react the force at the flexible bladder received from the torque bar.

6. The method as defined in claim 5 in which the spindle has a central axis substantially parallel to the torque bar central axis and in which the spindle central axis and the torque bar central axis are offset relative to each other.

7. The method as defined in claim 6 comprising the further steps of providing a shock absorber and dampening movement of the flexible bladder with the shock absorber.

8. A suspension system for use with a vehicle having a frame and a tire wheel assembly, the system comprising:

a suspension frame rail extending across the vehicle in a direction transverse to forward motion of the vehicle;

at least one flexible bladder mounted to the frame rail;

at least one torque bar elongated in a direction transverse to the forward motion of the vehicle and having a central axis which extends in the transverse direction of the torque bar; the torque bar extending adjacent to the suspension frame rail and being rotatable about the central axis; and a spindle adapted to receive a tire wheel assembly attached to the torque bar whereby movement of the spindle is reacted by the flexible bladder.

9. The suspension system as defined in claim 8 in which the torque bar is rotatably mounted to the suspension frame rail.

10. The suspension system as defined in claim 9 in which the torque bar is parallel to the suspension frame rail.

11. The suspension system of claim 8 in which rotation of the torque bar about the central axis applies force to the flexible bladder.

12. The system of claim 8 wherein the transverse direction of the torque bar and central axis is substantially perpendicular to the forward motion of the vehicle.

13. The system of claim 12 wherein the torque bar axis is substantially horizontal.

14. A suspension system for use with a vehicle having a frame and a tire wheel assembly, the system comprising:

a suspension frame rail;

at least one flexible bladder mounted to the frame rail;

at least one elongated torque bar having a central axis which is longitudinal in the elongated direction of the torque bar; the torque bar extending adjacent to the suspension frame rail and being rotatable about the central axis; and a spindle adapted to receive a tire wheel assembly attached to the torque bar whereby movement of the spindle is reacted by the flexible bladder; and an actuator which is operatively connected to the torque bar and contacts the flexible bladder to move the flexible bladder in response to movement of the spindle.

15. A suspension system for use with a vehicle having a frame and a tire wheel assembly, the system comprising:

a suspension frame rail;

at least one flexible bladder mounted to the frame rail;

at least one torque bar having a central axis and extending adjacent to the suspension frame rail; the torque bar being rotatable about the central axis;

a spindle adapted to receive a tire wheel assembly attached to the torque bar whereby movement of the spindle is reacted by the flexible bladder; and a mounting clevis rigidly attached to the torque bar and a push rod movably attached to the mounting clevis whereby rotation of the torque bar causes movement of flexible bladder via the push rod.

16. The system of claim 15 wherein a spindle lever extends outwardly from the torque bar and the spindle is mounted to the spindle lever so that upward or downward force applied to the spindle is transferred through the spindle lever to rotate the torque bar about its central axis.

17. The suspension system of claim 15 wherein the spindle has a central axis substantially parallel to and offset from the torque bar axis; the spindle being adapted to receive the tire wheel assembly rotatably about the spindle central axis.

18. A suspension system for use with a vehicle having a frame and a tire wheel assembly, the system comprising:

a suspension frame rail;

at least one flexible bladder mounted to the frame rail;

at least one torque bar having a central axis and extending adjacent to the suspension frame rail; the torque bar being rotatable about the central axis;

a spindle adapted to receive a tire wheel assembly attached to the torque bar whereby movement of the spindle is reacted by the flexible bladder; and a spindle lever extending outwardly from the torque bar; the spindle being mounted to the spindle lever so that upward or downward force applied to the spindle is transferred through the spindle lever to rotate the torque bar about its central axis.

19. The system of claim 18 wherein the spindle lever is rigidly mounted to the spindle and the torque bar.

20. The suspension system of claim 18 wherein the spindle has a central axis substantially parallel to and offset from the torque bar axis; the spindle being adapted to receive the tire wheel assembly rotatably about the spindle central axis.

21. A suspension system for use with a vehicle having a frame and a tire wheel assembly, the system comprising:

a suspension frame rail;

at least one flexible bladder mounted to the frame rail; the flexible bladder being completely enclosed within a housing which defines two chambers separated by the flexible bladder whereby the flexible bladder serves as a diaphragm;

at least one torque bar having a central axis and extending adjacent to the suspension frame rail; the torque bar being rotatable about the central axis; and a spindle adapted to receive a tire wheel assembly attached to the torque bar whereby movement of the spindle is reacted by the flexible bladder.

22. The suspension system of claim 21 wherein one of the chambers defines an aperture through which to receive pressurized air into said chamber and wherein an actuator is movably connected to the torque bar and the other chamber defines an aperture through which the actuator is slidingly received to move the flexible bladder in response to the movement of the spindle.

23. The suspension system of claim 22 wherein the movement of the spindle causes rotation of the torque bar and the spindle about the torque bar central axis.

24. A method of supporting a load on a vehicle comprising the steps of:

providing a vehicle with a frame, a pair of tire wheel assemblies, a spindle for mounting each tire wheel assembly and a spindle lever connected to each of the spindle and a torque bar having a central axis;

applying a force either upwardly or downwardly on the tire wheel assemblies;

transferring the force from each tire wheel assembly into the torque bar;

rotating the torque bar about the central axis as a result of the force;

transferring the force from the spindle to the spindle lever; transferring the force from the spindle lever to the torque bar; and transferring the force from at least one flexible bladder to the torque bar; and reacting the rotational movement of the torque bar in the at least one flexible bladder mounted to the frame.

25. A suspension system for use with a vehicle having a frame and a tire wheel assembly, the system comprising:
   a suspension frame rail;
   a housing mounted to the frame rail;
   at least one flexible bladder completely enclosed within the housing; the housing defining two chambers separated by the flexible bladder whereby the flexible bladder serves as a diaphragm;
   at least one torque bar disposed adjacent the suspension frame rail; and
   a spindle adapted to receive a tire wheel assembly attached to the torque bar whereby movement of the spindle is reacted by the flexible bladder.

26. The suspension system of claim 25 wherein one of the chambers defines an aperture through which to receive pressurized air into said chamber to help the flexible bladder react movement of the spindle.

27. The suspension system of claim 26 wherein an actuator is movably connected to the torque bar and the other chamber defines an aperture through which the actuator is slidingly received to move the flexible bladder when the torque bar is rotated.

28. A suspension system for use with a vehicle having a frame and a pair of tire wheel assemblies, the system comprising:
   at least one flexible bladder disposed within a housing, the housing being positioned in fixed relation with respect to the frame;
   a torque bar disposed adjacent the frame and having an axis about which the torque bar is rotatable;
   a spindle adapted to receive one of the tire wheel assemblies; the spindle being rigidly mounted to the torque bar and being rotatable about the torque bar axis whereby movement of the spindle causes rotation of the torque bar and whereby said movement is reacted by the at least one flexible bladder.

29. The suspension system of claim 28 wherein the spindle has a central axis parallel to and offset from the torque bar axis; the spindle being adapted to receive the tire wheel assembly rotatably about the spindle central axis.

30. The suspension system of claim 29 wherein the torque bar is elongated and the torque bar axis is longitudinal along the length of the torque bar.

31. The suspension system of claim 30 wherein the torque bar axis is central.

32. The suspension system of claim 31 wherein the torque bar is rotatably mounted within a plurality of spaced bearings having respective central axes which are coaxial with the torque bar central axis.

33. The suspension system of claim 29 further including a spindle lever rigidly mounted to and extending between the spindle and the torque bar.

34. The suspension system of claim 33 further comprising a suspension frame rail to which the flexible bladder housing is rigidly mounted.

35. The suspension system of claim 33 wherein an actuator is operatively connected to the torque bar and contacts the flexible bladder to move the flexible bladder in response to movement of the spindle.

36. The suspension system of claim 35 wherein the flexible bladder is completely enclosed within the housing.

37. The suspension system of claim 36 wherein a mounting clevis is rigidly attached to the torque bar and the actuator is movably attached to the mounting clevis.

38. The suspension system of claim 37 further comprising a suspension frame rail to which the flexible bladder housing is rigidly mounted.

39. The suspension system of claim 30 further comprising an elongated suspension frame rail disposed parallel to the torque bar; the flexible bladder housing being rigidly mounted on the frame rail.

40. The suspension system of claim 39 wherein there are a plurality of flexible bladders disposed within respective housings, each housing being rigidly mounted on the frame rail; whereby movement of the spindle is reacted by the plurality of flexible bladders.

41. The suspension system of claim 40 wherein movement of the spindle is reacted equally by each flexible bladder.

42. The suspension system of claim 41 further comprising a second spindle having a central axis and being adapted to receive the other tire wheel assembly rotatably about the spindle central axis; a second elongated torque bar disposed parallel to the frame rail and having a longitudinal axis along the length of the torque bar; the spindle central axis being parallel to and offset from the second torque bar axis; a plurality of second flexible bladders disposed within respective housings, each housing being rigidly mounted on the frame rail; whereby movement of the second spindle causes rotation of the second torque bar and whereby said movement is reacted by the plurality of second flexible bladders.

43. The suspension system of claim 42 wherein movement of the second spindle is reacted equally by each second flexible bladder.

44. The suspension system of claim 28 wherein the flexible bladder is completely enclosed within the housing.

45. The suspension system of claim 44 wherein flexible bladder is housed within a diaphragm chamber assembly traditionally used with tractor trailer air brakes.

46. The suspension system of claim 44 wherein the housing defines two chambers separated by the flexible bladder whereby the flexible bladder serves as a diaphragm.

47. The suspension system of claim 46 wherein one of the chambers defines an aperture through which to receive pressurized air into said chamber to help the flexible bladder react movement of the spindle.

48. The suspension system of claim 47 wherein an actuator is movably connected to the torque bar and the other chamber defines an aperture through which the actuator is slidingly received to move the flexible bladder when the torque bar is rotated.

49. A suspension system for use with a vehicle having a frame and a tire wheel assembly, the system comprising:
   a suspension frame rail;
   at least one flexible bladder mounted to the frame rail;
   at least one elongated torque bar having a central axis which is longitudinal in the elongated direction of the torque bar; the torque bar extending adjacent to the suspension frame rail and being rotatable about the central axis; and
   a spindle adapted to receive a tire wheel assembly attached to the torque bar whereby movement of the spindle is reacted by the flexible bladder-, and
   a mounting clevis rigidly attached to the torque bar and a push rod movably attached to the mounting clevis whereby rotation of the torque bar causes movement of flexible bladder via the push rod.

50. A suspension system for use with a vehicle having a frame and a tire wheel assembly, the system comprising:
   a suspension frame rail;
   at least one flexible bladder mounted to the frame rail;
   at least one elongated torque bar having a central axis which is longitudinal in the elongated direction of the torque bar; the torque bar extending adjacent to the suspension frame rail and being rotatable about the central axis; and a spindle adapted to receive a tire wheel assembly attached to the torque bar whereby movement of the spindle is reacted by the flexible bladder; and a spindle lever extending outwardly from the torque bar and the spindle being mounted to the spindle lever so that upward or downward force applied to the spindle is transferred through the spindle lever to rotate the torque bar about its central axis.

51. A suspension system for use with a vehicle having a frame and a tire wheel assembly, the system comprising:

a suspension frame rail;

at least one flexible bladder mounted to the frame rail;

at least one elongated torque bar having a central axis which is longitudinal in the elongated direction of the torque bar; the torque bar extending adjacent to the suspension frame rail and being rotatable about the central axis; and a spindle adapted to receive a tire wheel assembly attached to the torque bar whereby movement of the spindle is reacted by the flexible bladder; and a housing defining two chambers separated by the flexible bladder whereby the flexible bladder serves as a diaphragm.

52. A suspension system for use with a vehicle having a frame and a tire wheel assembly, the system comprising:

a flexible bladder;

a rotatable torque bar;

a spindle adapted to receive the tire wheel assembly attached to the torque bar;

a mounting clevis rigidly attached to the torque bar and a push rod movably attached to the mounting clevis whereby movement of the spindle causes rotation of the torque bar and movement of the flexible bladder via the push rod whereby movement of the spindle is reacted by the flexible bladder.

53. The system of claim 52 wherein a spindle lever extends outwardly from the torque bar and the spindle is mounted to the spindle lever so that upward or downward force applied to the spindle is transferred through the spindle lever to rotate the torque bar.

54. The system of claim 52 wherein the torque bar has an axis about which it is rotatable; wherein the spindle has a central axis substantially parallel to and offset from the torque bar axis; and wherein the spindle is adapted to receive the tire wheel assembly rotatably about the spindle central axis.

55. The suspension system of claim 52 wherein a housing defines two chambers separated by the flexible bladder whereby the flexible bladder serves as a diaphragm.

56. A suspension system for use with a vehicle having a frame and a tire wheel assembly, the system comprising:

a flexible bladder;

a rotatable torque bar;

a spindle adapted to receive a tire wheel assembly attached to the torque bar;

a spindle lever extending outwardly from the torque bar; the spindle being mounted to the spindle lever so that movement of the spindle causes rotation of the torque bar via the spindle lever whereby said movement is reacted by the flexible bladder.

57. The system of claim 56 wherein the spindle lever is rigidly mounted to the spindle and the torque bar.

58. The suspension system of claim 56 wherein a housing defines two chambers separated by the flexible bladder whereby the flexible bladder serves as a diaphragm.

59. The system of claim 56 wherein the torque bar has an axis about which it is rotatable; wherein the spindle has a central axis substantially parallel to and offset from the torque bar axis; and wherein the spindle is adapted to receive the tire wheel assembly rotatably about the spindle central axis.

60. A suspension system for use with a vehicle having a frame and a tire wheel assembly comprising:

a flexible bladder;

a housing defining two chambers separated by the flexible bladder whereby the flexible bladder serves as a diaphragm;

at least one torque bar; and a spindle adapted to receive a tire wheel assembly attached to the torque bar whereby movement of the spindle is reacted by the flexible bladder.

61. The system of claim 60 wherein the torque bar is rotatable whereby movement of the spindle causes rotational movement of the torque bar which is reacted by the flexible bladder.

62. The system of claim 61 wherein an actuator is movably connected to the torque bar whereby rotational movement of the torque bar causes the actuator to move the flexible bladder.

63. A suspension system for use with a vehicle having a frame and a tire wheel assembly, the system comprising:

a flexible bladder;

a torque bar having an axis about which the torque bar is rotatable;

a spindle adapted to receive the tire wheel assembly; the spindle being rigidly mounted to the torque bar and being rotatable about the torque bar axis whereby movement of the spindle causes rotation of the torque bar about its axis and whereby said movement is reacted by the at least one flexible bladder.

64. The suspension system of claim 63 wherein the torque bar is elongated and the axis extends in the elongated direction of the torque bar.

65. The suspension system of claim 63 in which a mounting clevis is rigidly attached to the torque bar and in which a push rod is movably attached to the mounting clevis whereby rotation of the torque bar causes movement of the flexible bladder via the push rod.

66. The suspension system of claim 63 wherein a spindle lever extends outwardly from the torque bar and the spindle is mounted to the spindle lever so that upward or downward force applied to the spindle is transferred through the spindle lever to rotate the torque bar about its axis.

67. The suspension system of claim 63 wherein a housing defines two chambers separated by the flexible bladder whereby the flexible bladder serves as a diaphragm.

68. The system of claim 63 wherein the movement of the spindle is vertical.

69. A method of supporting a load on a vehicle comprising the steps of:

applying an upward or downward force on a tire wheel assembly of a vehicle;

rotating an elongated torque bar about an axis extending in the elongated direction of the torque bar as a result of the force;

reacting the rotational movement of the torque bar in a flexible bladder; and transferring the force from a spindle for mounting the tire wheel assembly to a spindle lever extending between the spindle and the torque bar; transferring the force from the spindle lever to the torque bar to rotate the torque bar about the axis; and transferring the force from the torque bar to the flexible bladder.

70. The method of claim 69 wherein the step of transferring the force from the torque bar to the flexible bladder includes the step of moving a push rod extending from the torque bar to the flexible bladder as a result of the rotation of the torque bar.

71. A method of supporting a load on a vehicle comprising the steps of:

applying an upward or downward force on a tire wheel assembly of a vehicle;

transferring the force from a spindle for mounting the tire wheel assembly to a spindle lever extending between the spindle and a torque bar to rotate the torque bar; and reacting the rotational movement of the torque bar in a flexible bladder.

72. The method of claim 71 further including the step of moving a push rod extending from the torque bar to the flexible bladder as a result of the rotation of the torque bar.

73. The method of claim 72 wherein a mounting clevis is rigidly attached to the torque bar and the push rod is movably attached to the mounting clevis.

74. The method claim 71 wherein a housing defines two chambers separated by the flexible bladder whereby the flexible bladder serves as a diaphragm.

75. The method of claim 71 wherein the torque bar has an axis about which a torque bar is rotatable; and wherein the spindle is rigidly mounted to the torque bar and is rotatable about the torque bar axis via the spindle lever.

* * * * *